United States Patent
Kurashima

(10) Patent No.: US 9,465,178 B2
(45) Date of Patent: Oct. 11, 2016

(54) OPTICAL TRANSCEIVER ADAPTED TO ANGLED POLISH CONNECTOR AND A METHOD TO ASSEMBLE THE SAME

(71) Applicant: Sumitomo Electric Industries, Ltd., Osaka-shi (JP)

(72) Inventor: Hiromi Kurashima, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 169 days.

(21) Appl. No.: 14/533,902

(22) Filed: Nov. 5, 2014

(65) Prior Publication Data

US 2015/0125120 A1    May 7, 2015

(30) Foreign Application Priority Data

Nov. 5, 2013 (JP) .................................. 2013-229364

(51) Int. Cl.
*G02B 6/42* (2006.01)

(52) U.S. Cl.
CPC ............. *G02B 6/4292* (2013.01); *G02B 6/423* (2013.01); *G02B 6/4256* (2013.01); *G02B 6/421* (2013.01); *Y10T 29/49959* (2015.01)

(58) Field of Classification Search
None
See application file for complete search history.

(56) References Cited

U.S. PATENT DOCUMENTS

| 7,559,704 B2 * | 7/2009 | Togami ................ G02B 6/4219 385/88 |
| 2005/0180754 A1* | 8/2005 | Mizue ................... G02B 6/4246 398/135 |
| 2005/0286839 A1* | 12/2005 | Yoshikawa .......... G02B 6/4201 385/92 |

FOREIGN PATENT DOCUMENTS

JP         2005-181554 A        7/2005

* cited by examiner

*Primary Examiner* — Michelle R Connelly
(74) *Attorney, Agent, or Firm* — Venable LLP; Michael A. Sartori

(57) ABSTRACT

An optical transceiver adapted to an optical connector having an angled physical contact (APC) is disclosed. The optical transceiver installs an optical sub-assembly to receive an external connector. The optical sub-assembly provides an index surface that indexes the inclined direction of the end of the stub abutting against the end surface of the external connector of the type of the APC. The housing provides a saddle with a flat surface on which the index surface of the optical sub-assembly is set.

11 Claims, 13 Drawing Sheets

OPTICAL TRANSCEIVER ADAPTED TO ANGLED POLISH CONNECTOR AND A METHOD TO ASSEMBLE THE SAME

BACKGROUND OF THE INVENTION

1. Field of the Invention

The present invention relates to an optical transceiver, in particular, the invention relates to an optical transceiver adapted to receive a connector of the angled physical contact (APC).

2. Related Background Arts

A Japanese Patent application laid open No. 2005-181554A has disclosed an optical connector implementing with a split sleeve, where the split extends from an opening to the other opening of the cylindrical body. The split sleeve aligns an optical fiber inserted from one opening with another optical fiber inserted from the other opening by abutting the tip ends of the optical fibers in the split sleeve. Those optical fibers are secured with ferrules in respective ends. The tip end of the ferrule a formed in convex with the tip end of the fiber to facilitate the physical contact against another ferrule securing the optical fiber.

Another type of an optical connector implemented with a special ferrule, which is often called as the angled physical contact (APC), is well known in the field. The connector of the APC type includes a ferrule whose end surface is inclined against the optical axis thereof. Inclined end surface reflects light coming from the optical fiber secured in the ferrule toward an irregular direction. That is, the light propagating in the optical fiber is reflected at the end surface of the ferrule but not returns within the optical fiber.

However, when the inclined direction of the end surface of one fiber is misaligned with the inclined direction of the end surface of another fiber abutting against the one fiber, the optical coupling between two fibers may be degraded. Accordingly, in the connector of the APC type, the inclined direction of one fiber is necessary to be aligned with the inclined direction of another fiber within a specific tolerance.

SUMMARY OF THE INVENTION

One aspect of the present application relates to an optical transceiver adapted to receive an optical connector of the APC type. The optical transceiver of an embodiment provides an optical sub-assembly and a housing. The optical sub-assembly includes a cylindrical coupling portion and a box portion. The box portion encloses an optically active device to perform at least one of the optical transmission and the optical reception. The cylindrical coupling portion includes an index outer surface and secures a stub therein. The stub has an end surface inclined with respect to an optical axis of the stub. The index outer surface indexes an inclined direction of the end surface of the stub. The housing, which encloses the optical sub-assembly therein, provides a saddle in uniformly contact with the index outer surface of the coupling portion. Because the index outer surface is fully and uniformly in contact with the top surface of the saddle, the inclined direction of the stub is always aligned with respect to the housing. An external connector of the APC type may align the inclined direction of the ferrule thereof with the stub in the coupling portion.

Another aspect of the present application relates to a method to assemble an optical transceiver that provides an optical sub-assembly and a housing. The optical sub-assembly includes a cylindrical coupling portion that secures a stub having an end surface inclined with an optical axis thereof and has an index outer surface and a flange. The index outer surface indexes the inclined direction of the end surface of the stub. The housing provides a slot and a saddle. The method comprises, (1) installing the optical sub-assembly into the housing as inserting the flange into the slot of the housing; (2) rotating the cylindrical coupling portion around the optical axis such that the index outer surface is uniformly in contact with the top surface of the saddle; and (3) inserting a holder into a gap between the flange and a wall forming the slot such that the holder pushes the flange against another wall forming the slot.

BRIEF DESCRIPTION OF THE DRAWINGS

The foregoing and other purposes, aspects and advantages will be better understood from the following detailed description of a preferred embodiment of the invention with reference to the drawings, in which.

DESCRIPTION OF EMBODIMENTS

Next, some embodiments of the present invention will be described as referring to accompany drawings. In the description of the drawings, numerals or symbols same with or similar to each other will refer to elements same with or similar to each other without duplicated explanations.

Figure 1:
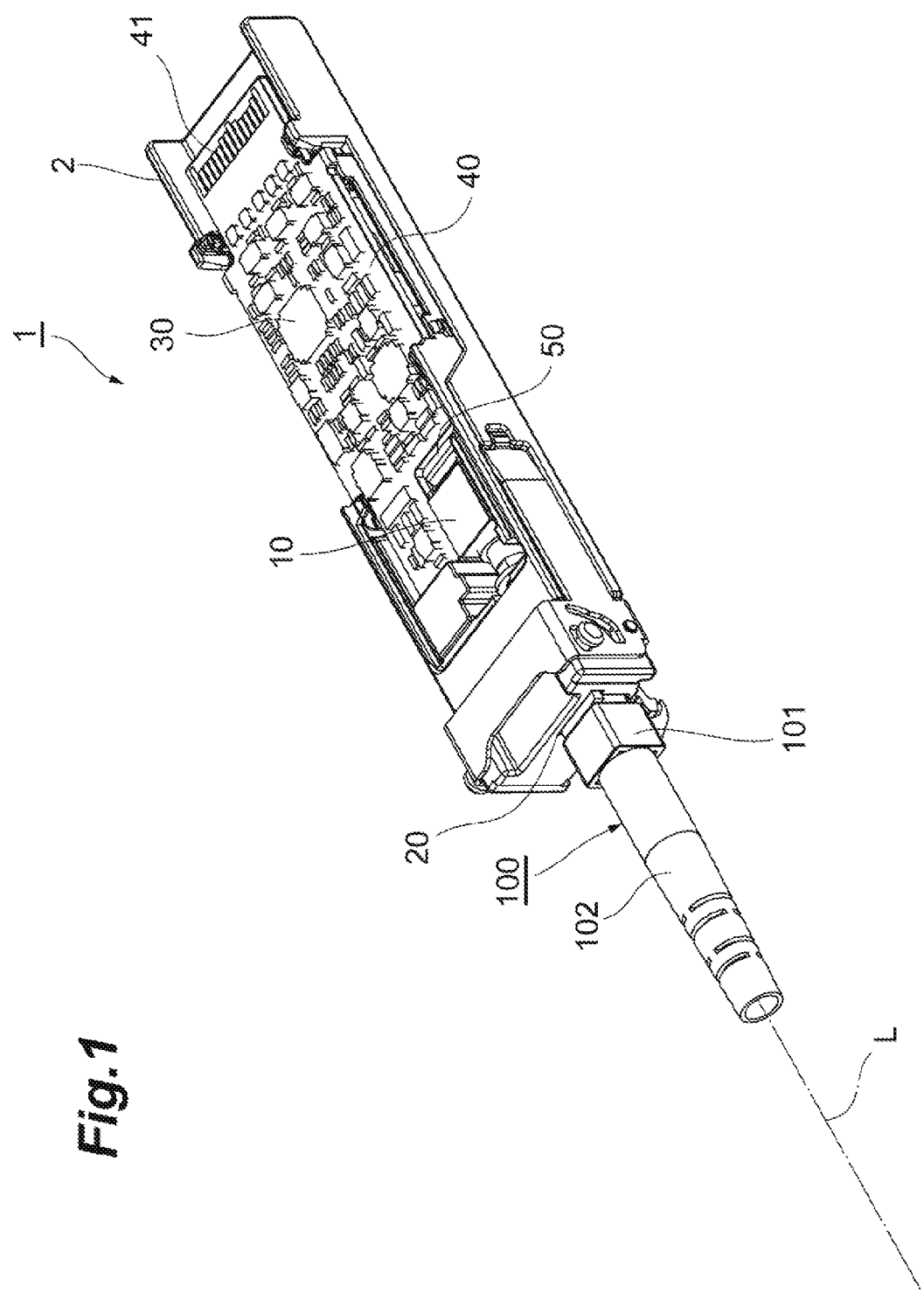
FIG. 1 is a perspective view showing an inside of the optical transceiver according to an embodiment of the invention.
Figure 2:
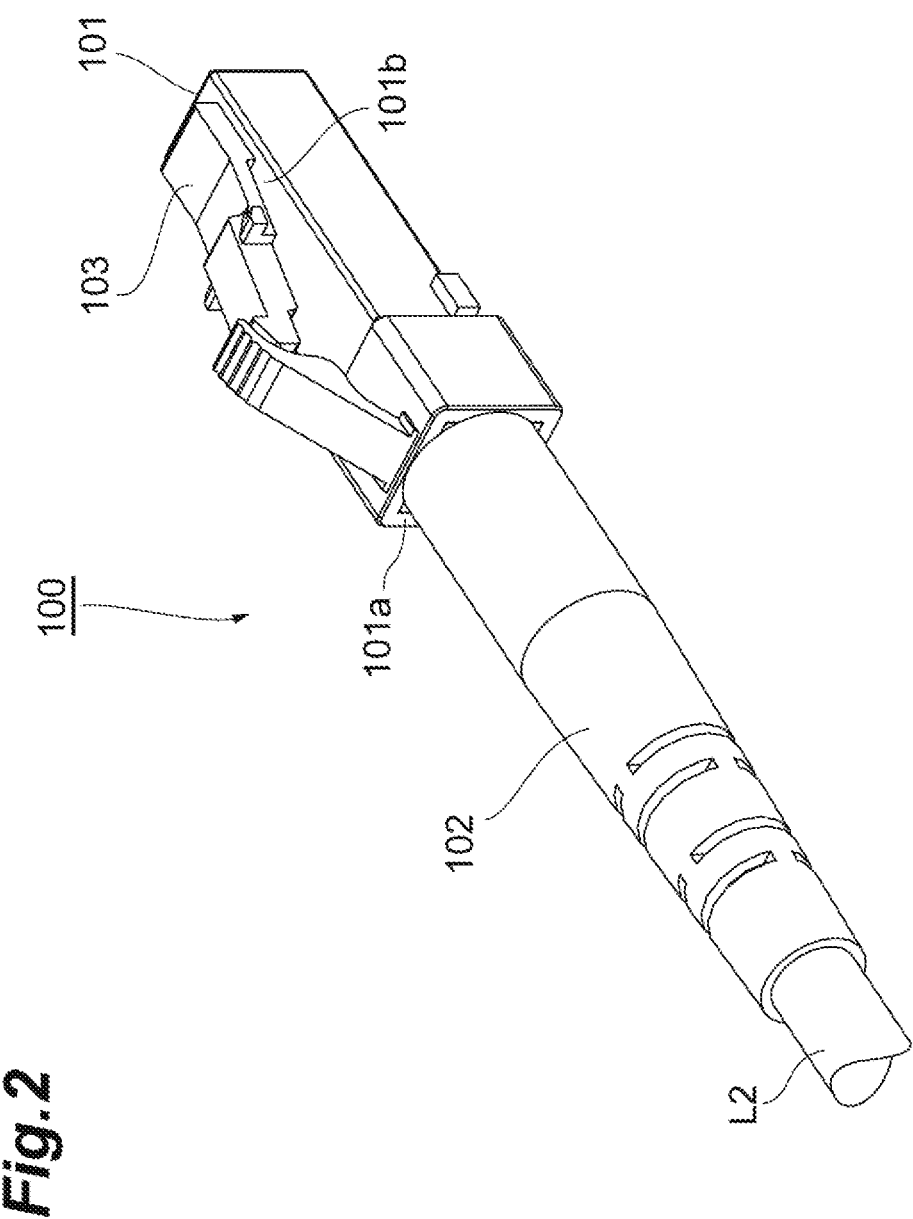
FIG. 2 is a perspective view of an optical connector to be mated with the optical transceiver shown in FIG. 1.
Figure 3:
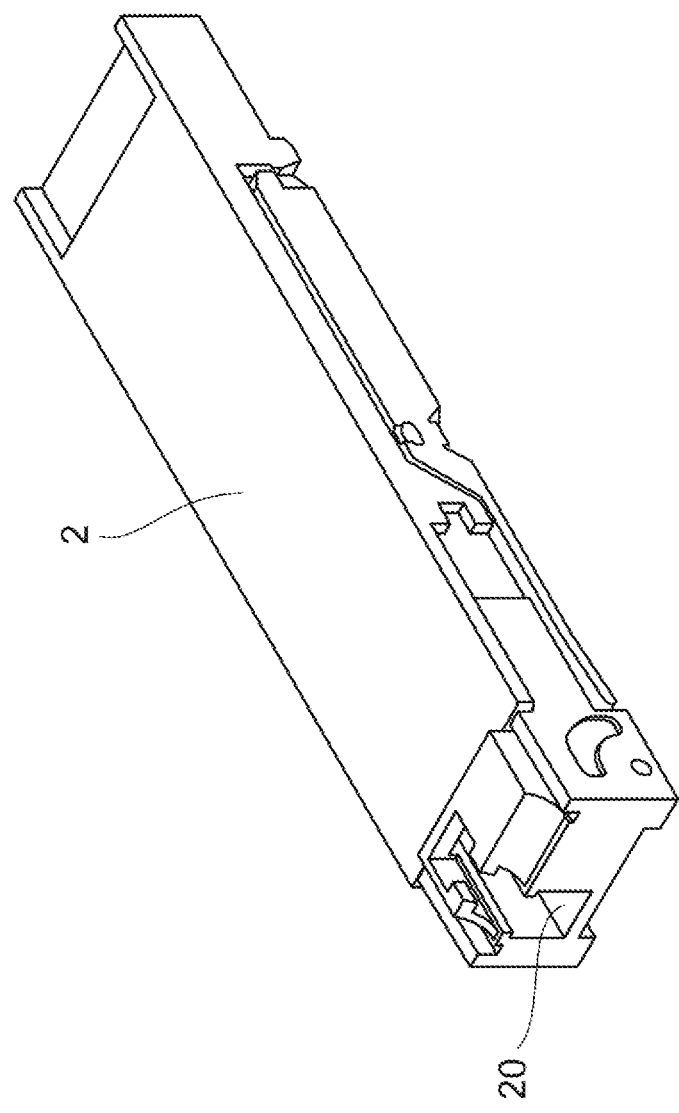
FIG. 3 shows an outer appearance of the optical transceiver shown in FIG. 1.

FIG. 1 is a perspective view showing an inside of an optical transceiver 1 according to an embodiment of the present invention, FIG. 2 is also a perspective view showing an embodiment of an optical connector 100 mated with the optical transceiver 1 shown in FIG. 1, and FIG. 3 is an outer appearance of the optical transceiver 1. The optical transceiver 1 of the present invention provides a housing 2, an optical sub-assembly (OSA) 10, an optical receptacle 20, electronic circuits 30, a printed circuit board (PCB) 40, and a flexible printed circuit (FPC) board 50. The optical transceiver 1 may be a pluggable optical transceiver, where some of specifications thereof follow one of multi-source agreement (MSA) called the XFP. An optical transceiver is featured to have function of the optical transmission and the optical reception to perform the full-duplex optical communication using a pair of optical fibers. The present specification concentrates on the optical transmission, but sprits of the present invention may be applicable to the optical reception.

As shown in FIGS. 1 and 2, the optical receptacle 20, which is provided in one longitudinal end of the optical transceiver 1, receives an external optical connector 100 to couple the OSA 10 optically with an external optical fiber L2 secured in the optical connector 100. The optical connector 100 provides a box-shaped housing 101 and a cylindrical boot 102 attached to one side 101a of the box-shaped housing 101. The external optical fiber L2 passes through the housing 101 and the cylindrical boot 102. A top of the box-shaped housing 101 provides a grip 103 extending outwardly. Setting the grip 103 within a wall of the optical receptacle 20, the optical connector 100 may be latched with the optical receptacle 20.

Referring to FIG. 1, the electronic circuits 30 are mounted on the PCB 40 and drives the OSA 10. The electronic circuits 30 include a driver to drive optical devices installed within the OSA 10. The OSA 10 is electrically connected to the circuits 30 on the PCB 40 through the FPC board 50. A rear portion of the PCB 40 provides an electrical plug 41 to communicate with the external host system.

Figure 4:
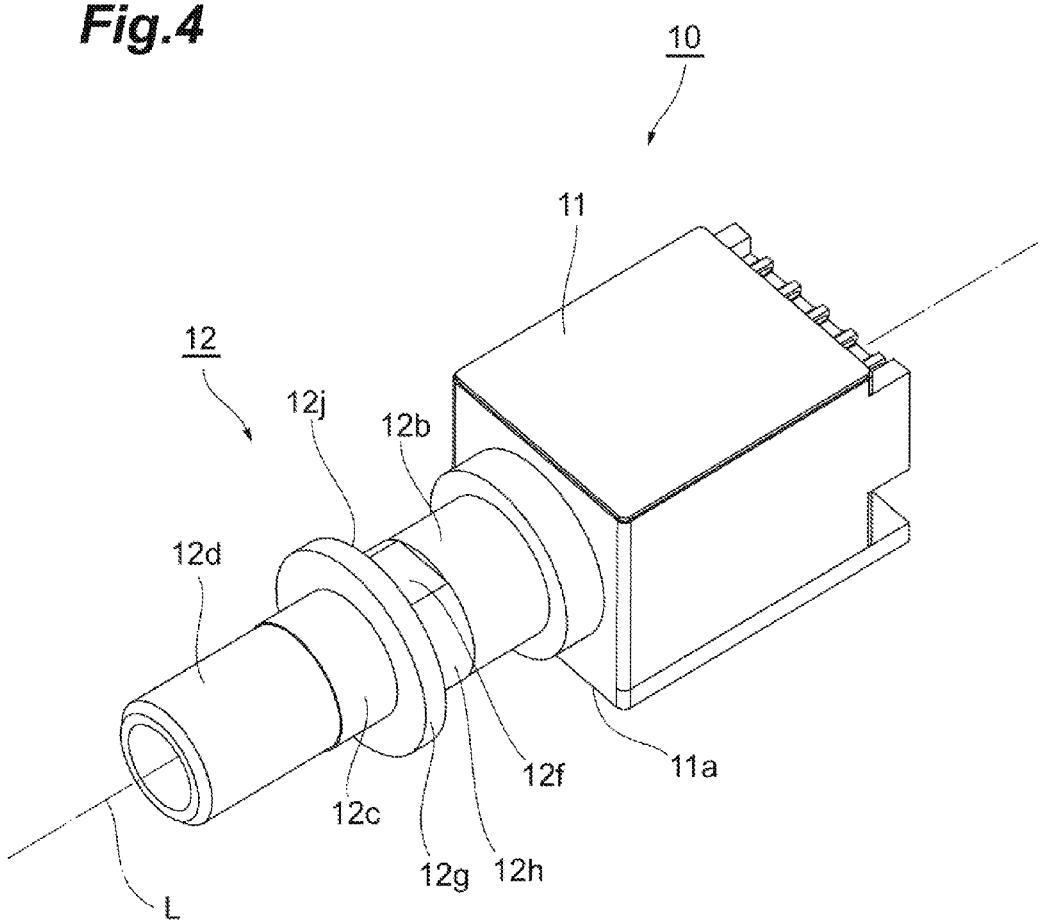
FIG. 4 shows an outer appearance of an optical sub-assembly to be installed within the optical transceiver shown in FIG. 1.

FIG. 4 shows an outer appearance of the OSA 10. The OSA 10, which transmits an optical signal externally, provides a box portion 11 to install optical devices such as a light-emitting device therein and a coupling portion 12 to couple the optical devices in the box portion with the optical fiber L2. The coupling portion 12 has a cylindrical shape.

Figure 5:
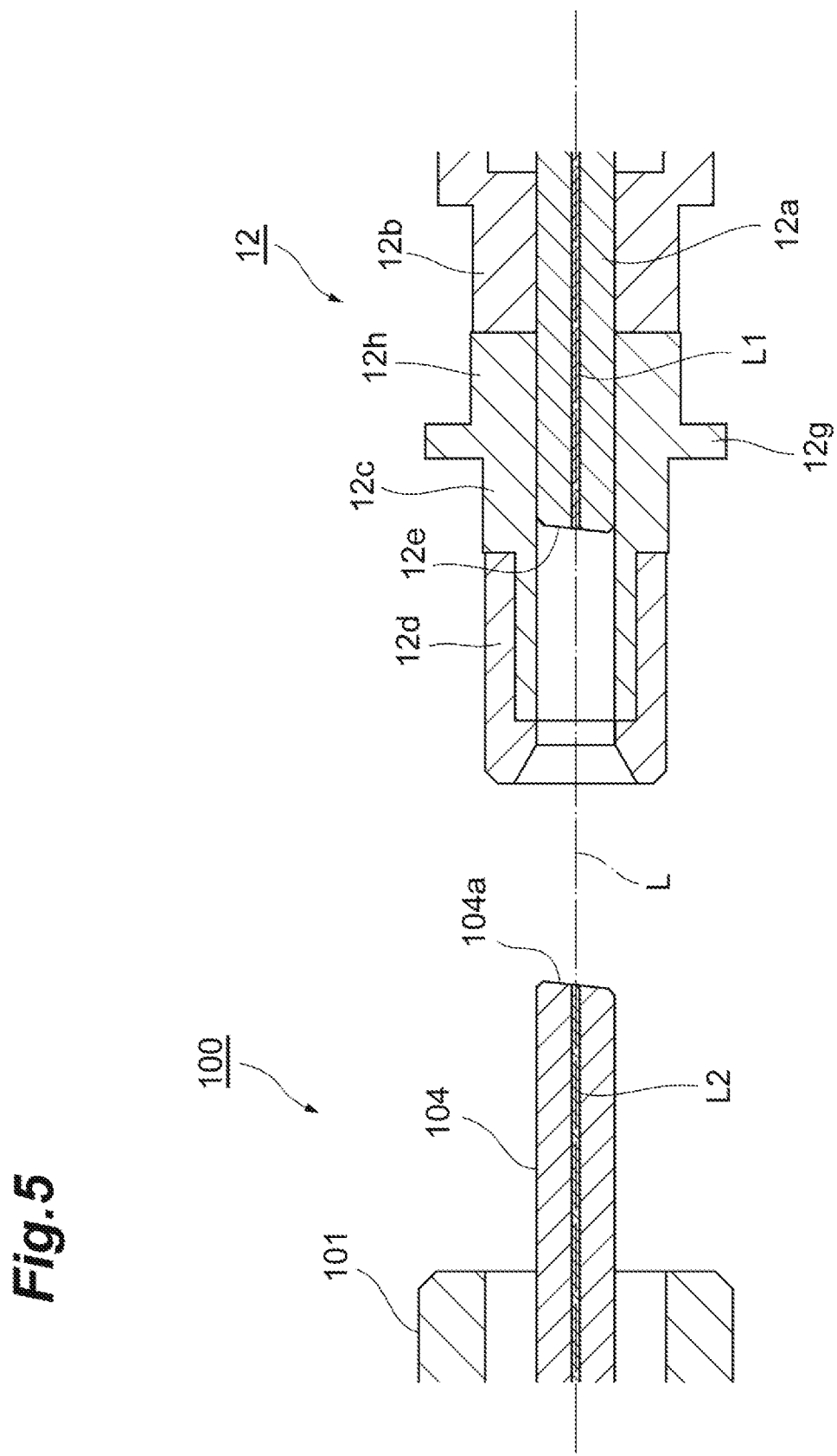
FIG. 5 schematically shows cross sections of the optical connector shown in FIG. 2 and a coupling portion of the optical sub-assembly shown in FIG. 4.

As shown in FIGS. 4 and 5, the coupling portion 12 provides, from the side of the box portion 11, a stub 12a, a bush 12b, a sleeve 12c, and a cover 12d. The stub 12a secures a coupling fiber L1 in a center thereof, which is the type of the single mode fiber. A feature of the stub 12a of the embodiment is that the tip end 12e of the stub 12a exposes an end of the coupling fiber L1, and this end surface 12e accompanied with coupling fiber L1 is inclined with respect to an optical axis L of the coupling fiber L1 to form, what is called, the angled physical contact (APC) surface.

The sleeve 12c secures an end portion of the stub 12a, and a root portion of the stub 12a is supported by the bush 12b. The sleeve 12c has a cylindrical shape with a bore into which the end portion of the stub 12a and a ferrule 104 of the external optical connector 100 is inserted. The sleeve 12c also provides in an outer surface thereof a flange 12g, two index surfaces 12f in a side 12h closer to the box portion 11 from the flange 12g. Two index surfaces 12f, which are symmetrically formed with respect to the axis L of the stub 12a, become reference surfaces to form the inclined end surface 12e of the stub 12a.

The optical connector 100 provides the ferrule 104 to be inserted within the bore of the sleeve 12c. The ferrule 104 secures the external optical fiber L2 in a center thereof. The end surface 104a of the ferrule 104 exposes the tip end of the external fiber L2 and is inclined, accompanied with the end surface of the external fiber L2, with respect to the axis of the external fiber L2 to form the APC structure.

As described, the ferrule 104 is mated with the sleeve 12c. Specifically, the ferrule 104 is inserted within the bore of the sleeve 12c. Inserting the ferrule 104 into the bore of the sleeve 12c and abutting the end surface 104a thereof against the end surface 12e of the stub 12a, the optical coupling between the coupling fiber L1 and the external fiver L2 may be realized. When the inclined direction of the end surface 104a of the ferrule 104 is misaligned with the inclined direction of the end surface 12e of the stub 12a, a gap is formed between two fibers, L1 and L2, which increases the optical coupling loss therebetween. Even when the inclined direction of the end surface 104a of the ferrule 104 is misaligned with the inclined direction of the end surface 12e of the stub 12a, the inclined directions of the end surfaces, 104a and 12e, are automatically aligned when the misalignment between the inclined directions of two surfaces, 104a and 12e, is within a preset range, which is called as the auto-alignment of end surfaces, 104a and 12e. Accordingly, the optical connector 100 is necessary to be inserted into the optical receptacle 20 as roughly aligning the inclined directions of the end surfaces, 104a and 12e.

Next, a mechanism to align the inclined directions of two end surfaces, 104a and 12e, roughly will be described.

Figure 6:
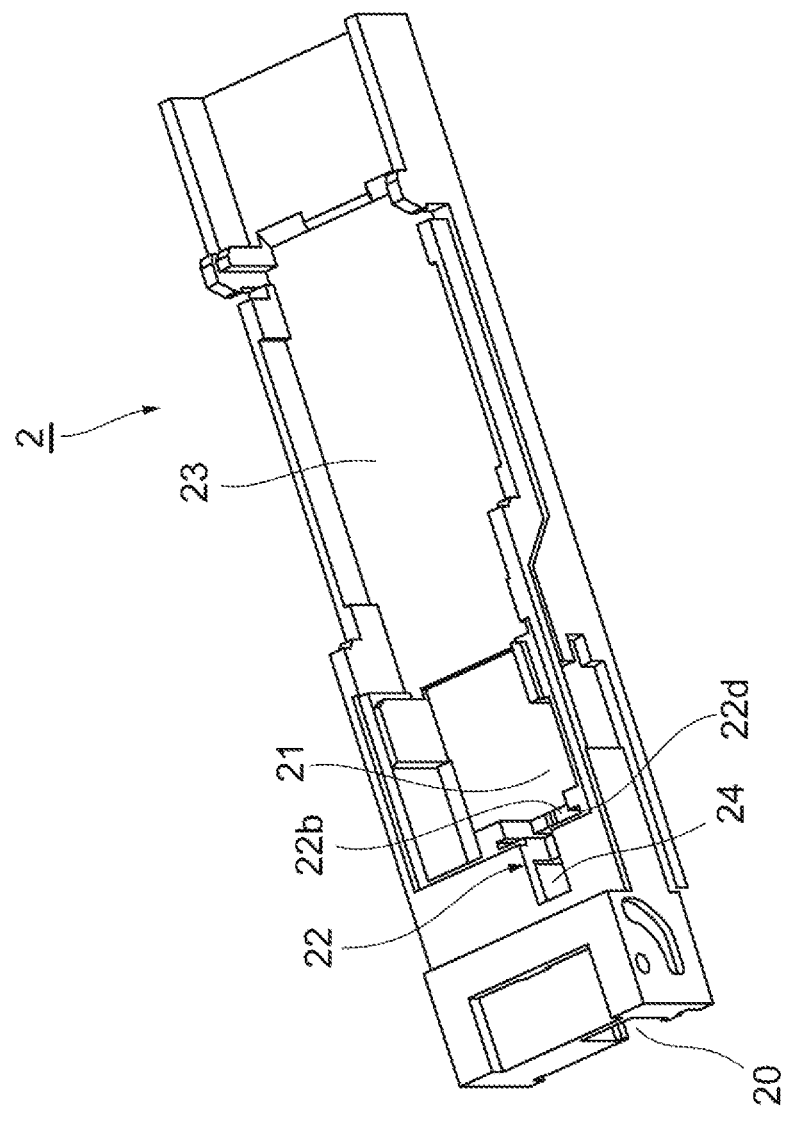
FIG. 6 is a perspective view of a housing of the optical transceiver shown in FIG. 3.
Figure 7:
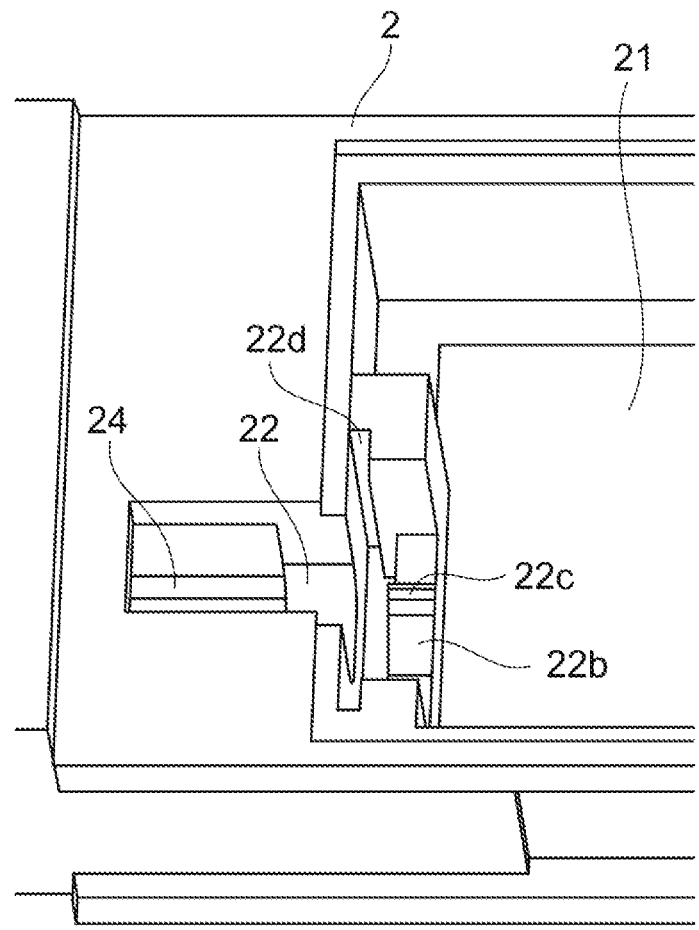
FIG. 7 magnifies a front portion of the housing where the optical sub-assembly shown in FIG. 4 is to be installed.

FIG. 6 shows an inside of the housing 2 and FIG. 7 magnifies a primary portion of the housing 2. The housing 2 provides the optical receptacle 20, a box pocket 21 into which the box portion 11 of the OSA 10 is placed, a sleeve pocket 22 into which the coupling portion 12 is set, and a PCB pocket 23 into which the PCB 40 is placed. The box pocket 21 and the sleeve pocket 22 are provided in just a rear of the optical receptacle 20, and the PCB pocket 23 is formed in a rear of the box pocket 21. The sleeve pocket 22 provides a saddle 22b to align the inclined direction of the end surface 12e.

Further specifically, the sleeve pocket 22 provides the cut 24. Inserting the sleeve 12c of the OSA 10 into the cut 24, the coupling portion 12 of the OSA 10 is easily set within the housing 2. Also, referring to FIGS. 7 and 10A to 10C, the saddle 22b, onto which the index surface 12f is set, is provided in the rear of the cut 24 so as to truncate the cut 24. The saddle 22b provides ribs 22c in both sides of a portion where the index surface 12f comes in contact. Moreover, provided between the cut 24 and the saddle 22b is a slot 22d into which the flange 12g and a holder 60 are inserted to fix the OSA 10.

Figure 8:
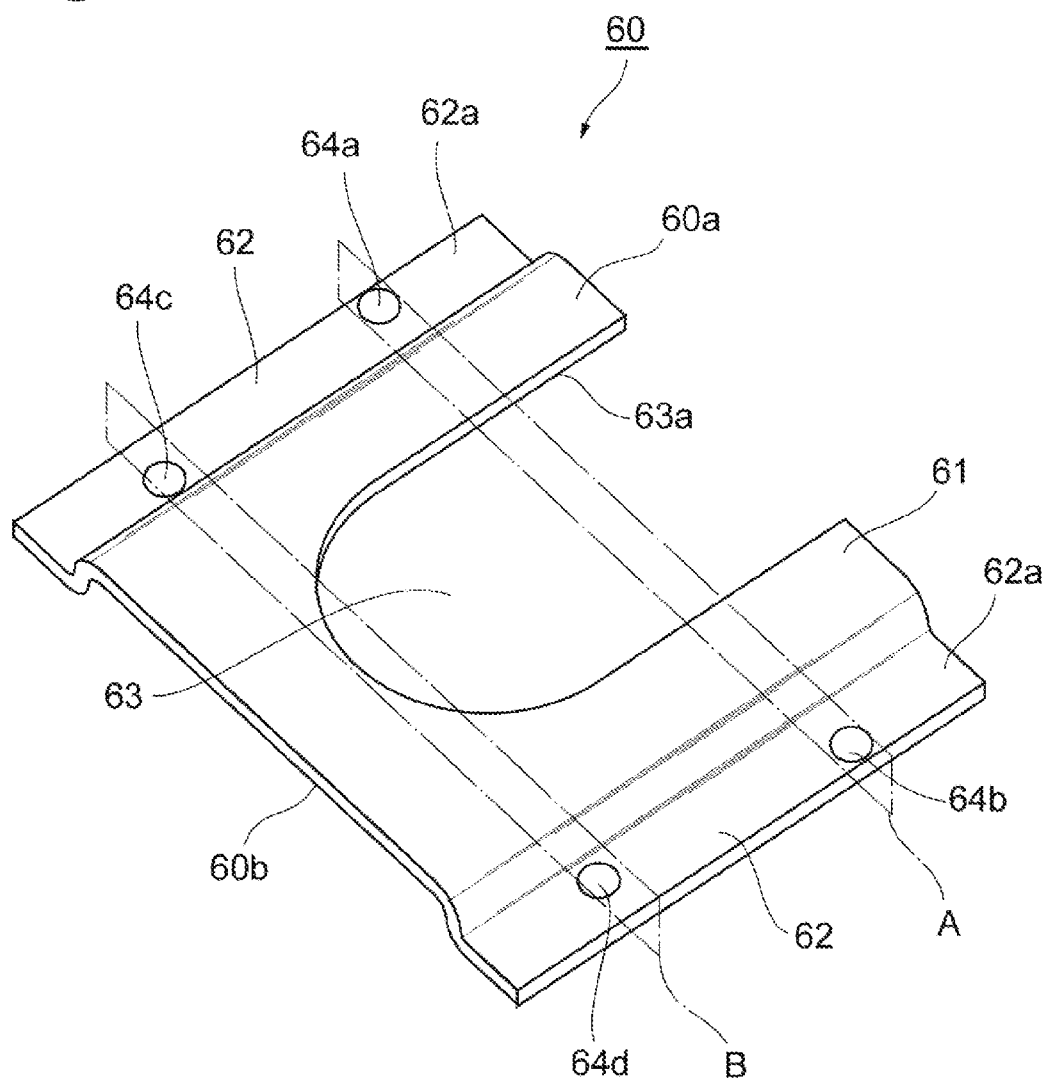
FIG. 8 is a perspective view of a holder to be set into a slot of the front portion of the housing.

FIG. 8 is a perspective view of the holder 60. The holder 60 may be formed by cutting and bending a metal plate. As shown in FIG. 8, the holder 60 has a rectangular plane shape with a terraced center portion 61 and hollowed side portions 62. The terraced center portion 61 provides a U-shaped cut 63 through which the sleeve 12c of the coupling portion 12 passes.

Passing the sleeve 12c through the cut 63, the flange 12g is in contact with a hollowed surface 60b of the terraced center portion 61, the neck 12h behind the flange 12g is set in the edges 63a of the cut 63, and the inner surface 12j of the flange 12g, which faces the box portion 11, comes in contact with the hollowed surface 60b.

The surfaces 62a of respective hollowed side portions 62 provide four projections, 64a to 64d, each having a size and a shape substantially same with others. Respective tops of the projections 64a to 64d abut against the rear wall 22r of the slot 22d when the holder 60 is set in the slot 22d.

Figure 13:
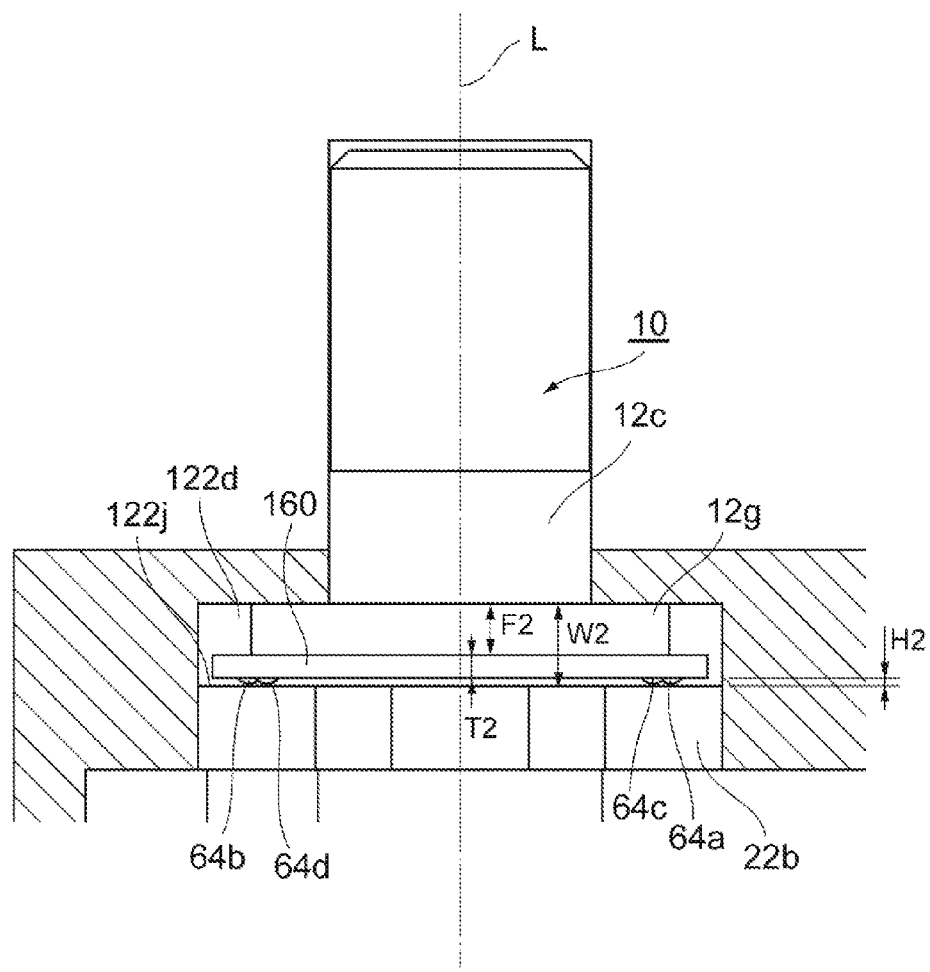
FIG. 13 is a plan view of the coupling portion of the optical sub-assembly shown set in the housing but as putting another type of holder into the gap to secure the coupling portion rigidly.

The embodiment of the holder 60 illustrated in FIG. 8 provides the terraced center portion 61, the hollowed side portions 62, and steps between two portions, 61 and 62. However, the holder 60 may have an arrangement without steps. That is, a holder with no terraced center portion and two hollowed side portions 62. FIG. 13 is a top view showing another arrangement of the holder 160. The holder 160 shown in FIG. 13 is formed by cutting a metal plate but without any bending to form the terraced center portion 61 and two hollowed side portions 62. The holder 160 shown in FIG. 13 also provides four projections 64a to 64d in respective two sides. Setting the holder 160 between the flange 12g and the front wall 122j of the saddle 22b, the projections, 64a to 64d, abut against the front wall 122j of the saddle 22b, and are partially crashed so as to press the holder 160 and the flange 12g forwardly, thus, the coupling portion 12 is rigidly fixed in the housing 2.

Figure 9:
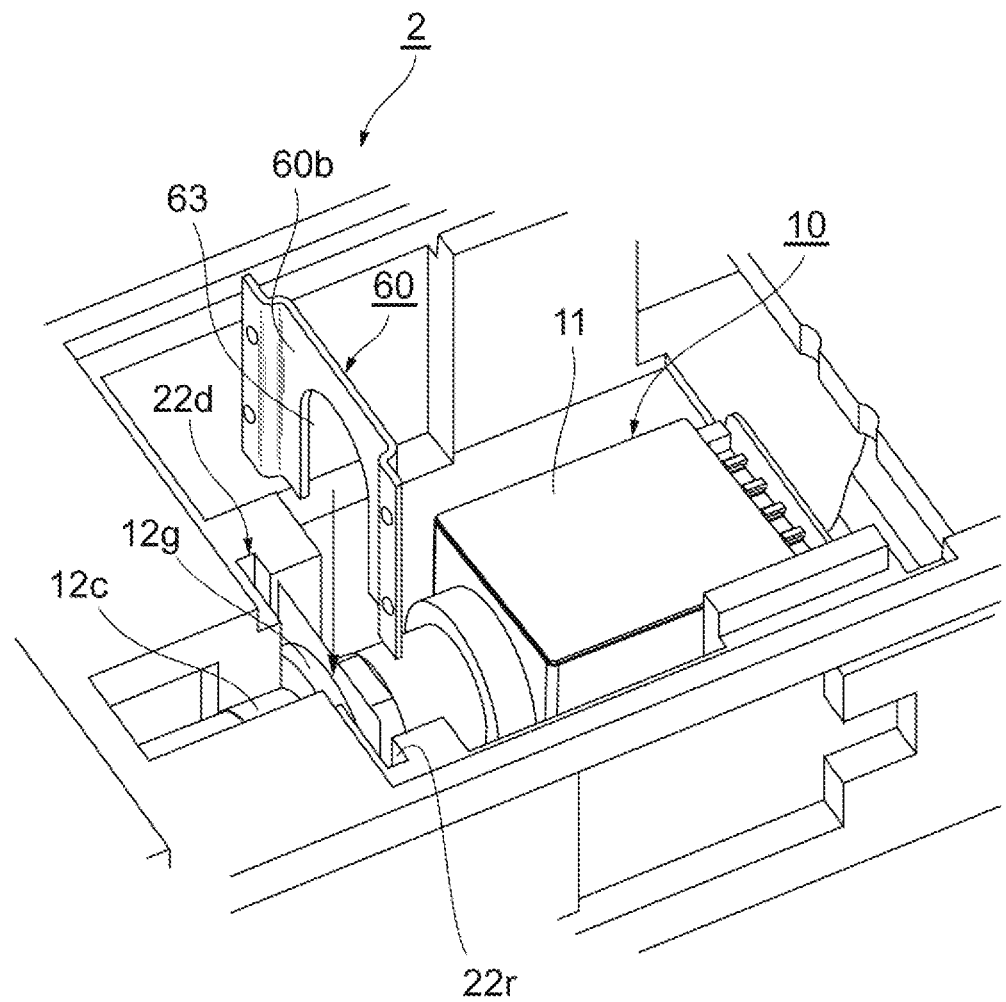
FIG. 9 shows a process to set the holder shown in FIG. 8 into the slot of the housing to fix the coupling portion of the optical sub-assembly shown in FIG. 4 in the front portion of the housing shown in FIG. 7.
Figure 10A:
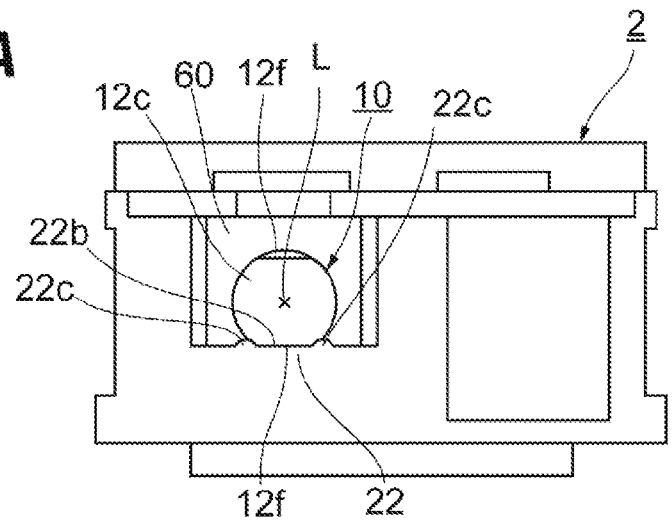
FIG. 10A shows a status where the coupling portion of the optical sub-assembly set regularly in the housing.
Figure 10B:
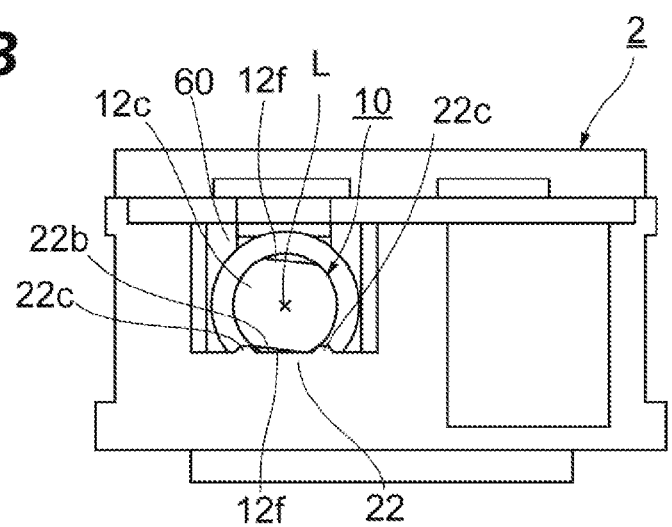
FIG. 10B shows another status where the coupling portion of the optical sub-assembly set irregularly in the housing, and FIG. 10C views, from the side of the optical receptacle, the coupling portion irregularly set in the housing.
Figure 10C:
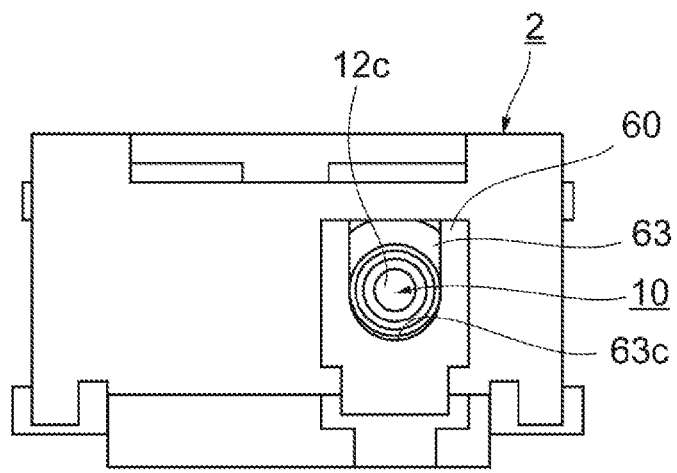

FIG. 9 magnifies the box pocket 21 and the box portion 11 set in the box pocket 21. FIGS. 10A to 10C show statuses of the OSA 10 rotating around the axis L of the coupling portion 12, where FIGS. 10A and 10B view the coupling portion 12 from the rear of the housing 2, while, FIG. 10C views the sleeve 12c from the front.

When the OSA 10 is installed within the housing 2, the flange 12g of the coupling portion 12 is first set within the slot 22d. When the rotational angle around the optical axis L of the coupling portion 12 is misaligned from the designed one, which causes a gap between the index surface 12f of the coupling portion 12 and the top of the saddle 22b, the OSA 10 may be rotated around the axis L such that the index surface 12f comes in closely contact with the top of the saddle 22b as shown in FIG. 10A.

Then, the holder 60 is set in the slot 22d such that the projections, 64a to 64d, of the holder 60 abut against the rear wall 22r of the side spaces 22s of the slot 22d, which pushes the flange 12g forward so as to abut against the front wall of the slot 22d. Thus, the OSA 10 is installed in the housing 2 as adjusting the rotational angle of the coupling portion 12 by making the index surface 12f of the coupling portion 12 in uniformly contact with the top of the saddle 22b. In such a state, inserting the external connector 100 securing the ferrule 104, whose end surface 104a is also inclined, into the optical receptacle 20 regularly, the inclined direction of the end surface 12e of the stub 12a and that of the end surface 104a of the ferrule 104 may be roughly aligned.

When the rotational angle of the coupling portion 12 is deviated from the designed angle, which means that the index surface 12f is not uniformly in contact with the top of the saddle 22b and the sleeve 12c forms a gap against the edge 63a of the U-shape cut 63. This gap may be easily recognized by inspecting the coupling portion 12 from the optical receptacle 20 by measuring a distance from the periphery of the sleeve 12c to the edge 63a of the U-shaped cut 63.

Figure 11:
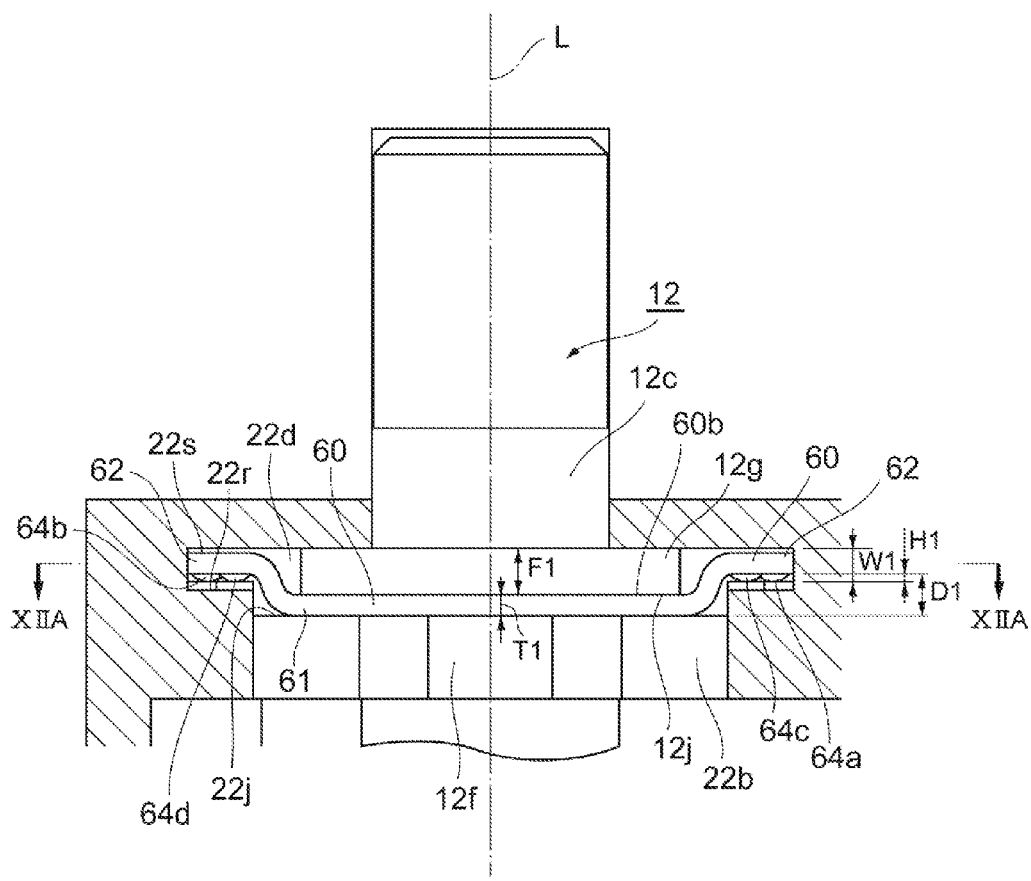
FIG. 11 is a plan view of the coupling portion of the optical sub-assembly set in the housing as putting the holder into a gap to secure the coupling portion rigidly.

FIG. 11 is a plan view of the coupling portion 12 whose flange 12g is set within the slot 22d. As shown in FIG. 11, the holder 60 is set between the flange 12g and the front wall 22j of the saddle 22b, where the front wall 22j of the saddle 22b constitutes rear wall forming the slot 22d. Also, the slot 22d provides side spaces 22s with a narrowed width in respective ends. The hollowed side portions 62 of the holder 60 is set in the side spaces 22s as abutting the projections, 64a to 64d, against the rear wall 22r of the side spaces 22s. The terraced center portion 61 of the holder 60 is set between the flange 12g and the saddle 22b in the center portion of the slot 22d that has a widened width compared to that of the side spaces 22s.

Assuming a thickness of the flange 12g, a width of the side spaces 22s of the slot 22d, a thickness of the holder 60, a step between the side spaces 22s and the center portion of the slot 22d, and heights of the projections, 64a to 64d, are F1, W1, T1, D1, and H1, respectively; the following relation is necessary to be satisfied to make the projections, 64a to 64d, rigidly in contact with the rear wall 22r of the side spaces 22s of the slot 22d and securely fix the flange 12g within the slot 22d:

$$F1+T1+H1-D1>W1. \tag{1}$$

Setting a dimension of a sum of F1, T1, and H1 subtracting D1 to be greater than W1, the projections, 64a to 64d, are securely abut against the rear wall 22r of the side spaces 22s of the slot 22d, and the terraced center portion 61 of the holder 60 pushes the rear surface of the flange 12g forward such that the front surface of the flange 12g is pushed against the front wall of the slot 22d.

When the holder 60 is inserted in a gap between the flange 12g and the front wall 22j of the saddle 22b; the projections, 64a to 64d, in the hollowed side portions 62 slide on the rear wall 22r of the side spaces 22s of the slot 22d as crushing the tops thereof. In the same time, the rear walls 22r of the side spaces 22s abrade. The present optical transceiver 1 has a mechanism to reduce the abrasion of the rear wall 22r of the side spaces 22s.

Figure 12A:
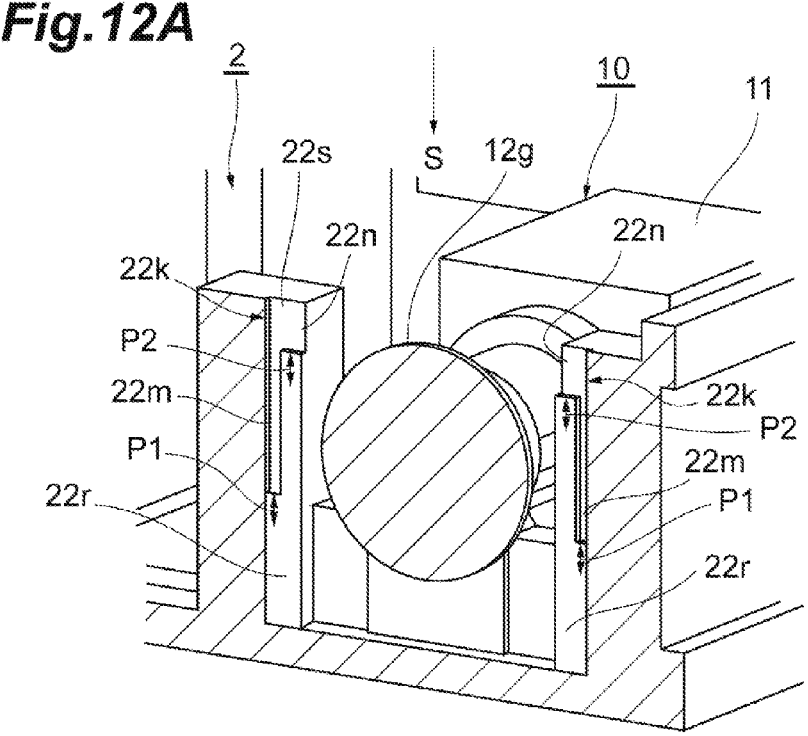
FIG. 12A is a cross sectional view of the coupling portion of the optical sub-assembly shown in FIG. 4 set in the slot of the housing.
Figure 12B:
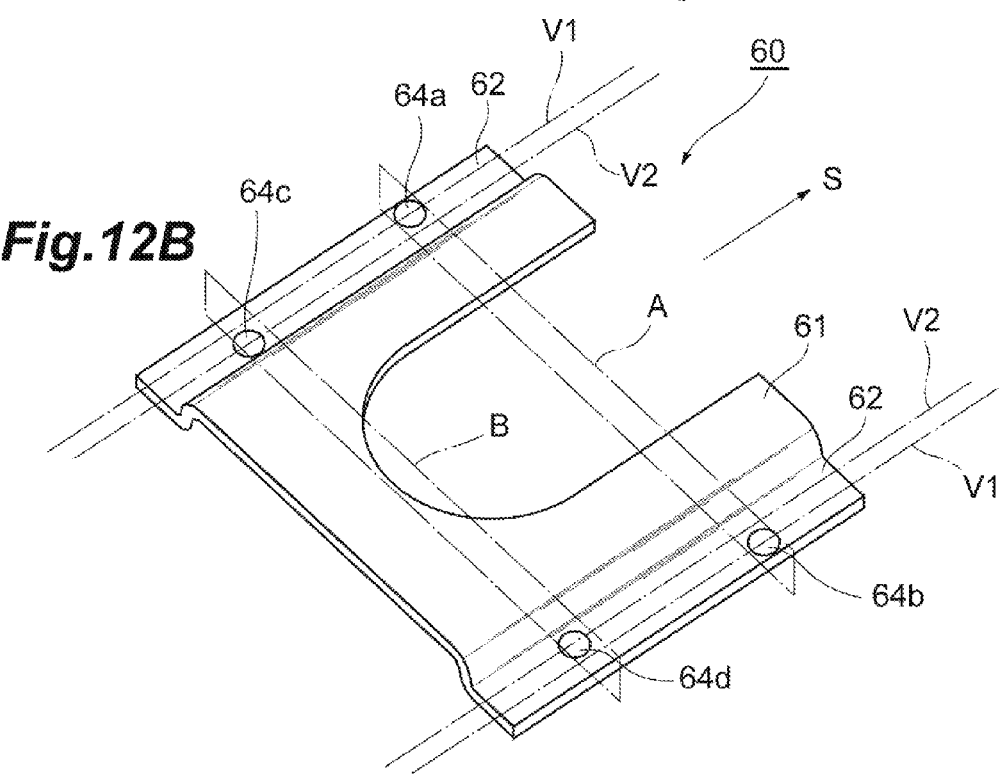
FIG. 12B shows the holder shown in FIG. 8 again.

FIG. 12A shows a cross section taken along the line XIIA-XIIA appearing in FIG. 11, and FIG. 12B illustrates the holder 60 again, which is substantially same with that shown in FIG. 8. The projections, 64a to 64d, are divided into two groups, A and B. The group A includes the projections, 64a and 64b, where they first abut against the rear wall 22r of the side spaces 22s when the holder 60 is inserted in the slot 22d. The group B includes the projections, 64c and 64d. Two projections, 64a and 64c, provided in one of the hollowed side portions 62 are offset with respect to the inserting direction S of the holder 60. Also, rest projections, 64b and 64d, provided in the other hollowed side portion 62 are offset with respect to the inserting direction S. The projections, 64a and 64b, in the group A is provided outside compared with the projections, 64c and 64d, in the group B. Further specifically, the projections, 64a and 64b, in the group A are set on lines V1, while, the rest projections, 64c and 64d, are set on other lines V2; and the lines V1 is drawn outside of the lines V2.

On the other hand, the rear walls 22r of the side spaces 22s of the slot 22d provide L-shaped hollows 22k. The hollow 22k includes two areas, 22m and 22n, where the former is extended along the insertion direction S of the holder 60, while, the latter extends laterally with respect to the insertion direction S.

When the holder 60 is inserted into the slot 22d, the projections, 64a and 64b, in the group A slide in the former area 22m, while, the other projections, 64c and 64d, in the group B slide in the other area 22n. The projections, 64a to 64d, make a gap against the rear wall 22r of the side spaces 22s when they slide in the respective areas, 22m and 22n. That is, the projections, 64a to 64d, in respective tips thereof are apart from the rear wall 22r of the side spaces 22s when they slide in respective areas, 22m and 22n. Further inserting the holder 60 into the slot 22d, the projections, 64a and 64b, in the group A ride on the step 22k, while, the other projections, 64c and 64d, in the group B also ride on the step 22k. Then, the projections, 64a to 64d, abut against the rear wall 22r of the side spaces 22s.

Under such an arrangement of the projections, 64a to 64d, and the step 22k, a distance P1 from the edge of the step 22k to a position, at which the projections, 64a and 64b, in the first group A stop, is substantially equal to a distance P2 from the edge of the step 22k in the area 22n to a position at which the projections, 64c and 64d, stop. Thus, the arrangement of the rear wall 22r of the side spaces 22s and the projections, 64a to 64d, of the holder 60 may shorten the length where the projections, 64a to 64d, slide not only for the projections, 64c and 64d, in the group B but for the projections, 64a and 64b, in the first group A. Also, the abrasion of the rear wall 22r of the side spaces 22s may be reduced.

When the index surface 12f in the coupling portion 12 is not formed in parallel to the bottom surface 11a of the box portion 11, the bottom surface 11a does not always come in contact with the bottom of the housing 2 even in the rotation angle of the sleeve 12c is aligned by making the index surface 12f in uniformly contact with the top of the saddle 22b. The bottom surface 11a of the box portion 11 often forms a gap against the bottom of the housing 2. The present optical transceiver 1 rigidly fixes the OSA 10 by setting the flange 12g of the coupling portion 12 in the slot 22d of the housing 2 and inserting the holder 60 between the flange 12g and the front wall 22j of the saddle 22b, which is unnecessary to secure the box portion 11 against the housing 2.

Also, when the OSA 10 in the box portion 11 thereof is set in the box pocket 21 and in the coupling portion 12 thereof is set within the sleeve pocket 22 as rotating the coupling portion 12 and the box portion 11 around the optical axis L such that the index surface 12f of the coupling portion 12 comes in uniformly contact with the top of the saddle 22b; the end surface 12e of the stub 12a in the inclined direction thereof may be roughly aligned with the inclined direction of the end surface 104a of the ferrule 104.

Moreover, the top of the saddle 22b provides a pair of ribs 22c putting the index surface 12f therebetween. When the coupling portion 12 is erroneously rotated, the index surface 12f rides on the rib 22c which lifts the coupling portion 12 upward to form a gap between the edge 63a of the cut 63 and the sleeve 12c. Because this status of the lifted coupling portion 12 may be easily and visually inspected, the assembling of the OSA 10 into the housing 2 is facilitated. Two ribs 22c, when the index surface 12f is properly set therebetween, may hold the index surface 12f stably, which enhances the tolerance against an unintentional rotation of the coupling portion 12.

Thus, the inventions of the present application are described as referring to exemplary drawings. The present inventions, however, are not restricted to those embodiments. It would be easily understood by an ordinary artisan in the field that many changes and modifications for such embodiments are applicable.

For instance, as shown in FIG. 13, the optical transceiver 1 may provide another type of slot 122d and the holder 160. The slot 122d shown in FIG. 13 provides no side spaces 22s but has a constant width. However, the holder 160 provides no terraced center portion 61 and no hollowed side portions 62. The holder 160 shown in FIG. 13 is made of a plane slab. Assuming a thickness of the flange 12g, a width of the slot 122d, a thickness of the holder 160, and heights of the projections, 64a to 64d, are F2, W2, T2, and H2, respectively; the next relation may be satisfied to securely fix the flange 12g within the slot 122d:

$$F2+T2+H2>W2. \quad (2)$$

Setting the physical dimensions of the members above so as to satisfy the relation, the stress felt by the projections, 64a to 64d, from the front wall 122j of the saddle 22b, the pressure between the holder 160 and the flange 12g, and the pressure between the flange 12g and the front wall of the slot 122d may be secured.

Also, the explanation above concentrates the OSA 10 having the box portion 11. However, the present optical transceiver 1 does not restrict the OSA with the box portion 11. For instance, the optical transceiver 1 of the present invention may install an OSA having a co-axial package. Although the co-axial package never comes in stably and uniformly contact with the bottom of the housing 2, the present optical transceiver 1 provides the slot 22d to receive the flange 12g of the OSA 10 and the holder 60 to fill a gap between the flange 12g and the slot 22d. Thus, the OSA 10 may be securely and stably installed within the housing 2 of the optical transceiver 1.

What is claimed is:

1. An optical transceiver, comprising:
    an optical sub-assembly including a cylindrical coupling portion and a box portion, the box portion enclosing an optically active device, the cylindrical coupling portion including an index outer surface and securing a stub with an end surface inclined with respect to an optical axis of the stub, the index outer surface indexing an inclined direction of the end surface of the stub; and
    a housing that encloses the optical sub-assembly therein, the housing providing a saddle being in uniformly contact with the index outer surface of the coupling portion.

2. The optical transceiver of claim 1,
    wherein the saddle of the housing provides a pair of ribs setting the index outer surface of the coupling portion therebetween.

3. The optical transceiver of claim 1,
    wherein the coupling portion further includes a sleeve configured to receive a ferrule of an external optical connector, the ferrule having an end surface inclined with respect to the optical axis, and
    wherein the end surface of the ferrule has an inclined direction equal to an inclination direction of the end surface of the stub.

4. The optical transceiver of claim 1,
    further comprising a holder,
    wherein the coupling portion further includes a flange and the housing further includes a slot configured to receive the flange of the coupling portion, and
    wherein the holder fills a gap between the flange and a wall forming the slot.

5. The optical transceiver of claim 4,
    wherein the holder pushes the flange of the coupling portion toward a side opposite to the index outer surface with respect to the flange.

6. The optical transceiver of claim 5,
    wherein the sub-assembly is secured only by setting the flange into the slot as the holder filling the gap, and the box portion is apart from the housing.

7. The optical transceiver of claim 4,
    wherein the holder has a projection crashed by abutting against the wall forming the slot.

8. The optical transceiver of claim 7,
    wherein the holder has another projection crashed by abutting against the wall forming slot, the projection and the another projection being offset with respect to a direction perpendicular to the optical axis.

9. The optical transceiver of claim 8,
wherein the wall forming the slot includes an L-shaped hollow with a first area and a second area, the projection riding on the wall from the first area and the another projection riding on the wall from the second area, and
wherein the projection has a distance from an edge of the first area equal to a distance from an edge of the second area for the another projection.

10. A method to assembly an optical transceiver comprising an optical sub-assembly and a housing, the optical sub-assembly having a box portion to encloses an optically active device therein and a cylindrical coupling portion securing a stub therein and providing an index outer surface and a flange, the stub having an end surface inclined with an optical axis of the stub, the index outer surface indexing an inclined direction of the end surface of the stub, the housing providing a slot and a saddle,
the method comprising steps of:
installing the optical sub-assembly into the housing as inserting the flange into the slot;
rotating the cylindrical coupling portion of the optical sub-assembly around the optical axis such that the index outer surface is uniformly in contact with a top surface of the saddle of the housing; and
inserting a holder into a gap between the flange and a wall forming the slot of the housing such that the holder pushes the flange against another wall forming the slot.

11. The method of claim 10,
wherein the saddle of the housing provides a pair of ribs,
wherein the step of rotating the coupling portion includes a step of setting the index outer surface of the coupling portion so as to be uniformly in contact with the top surface between the ribs.

* * * * *